UNITED STATES PATENT OFFICE.

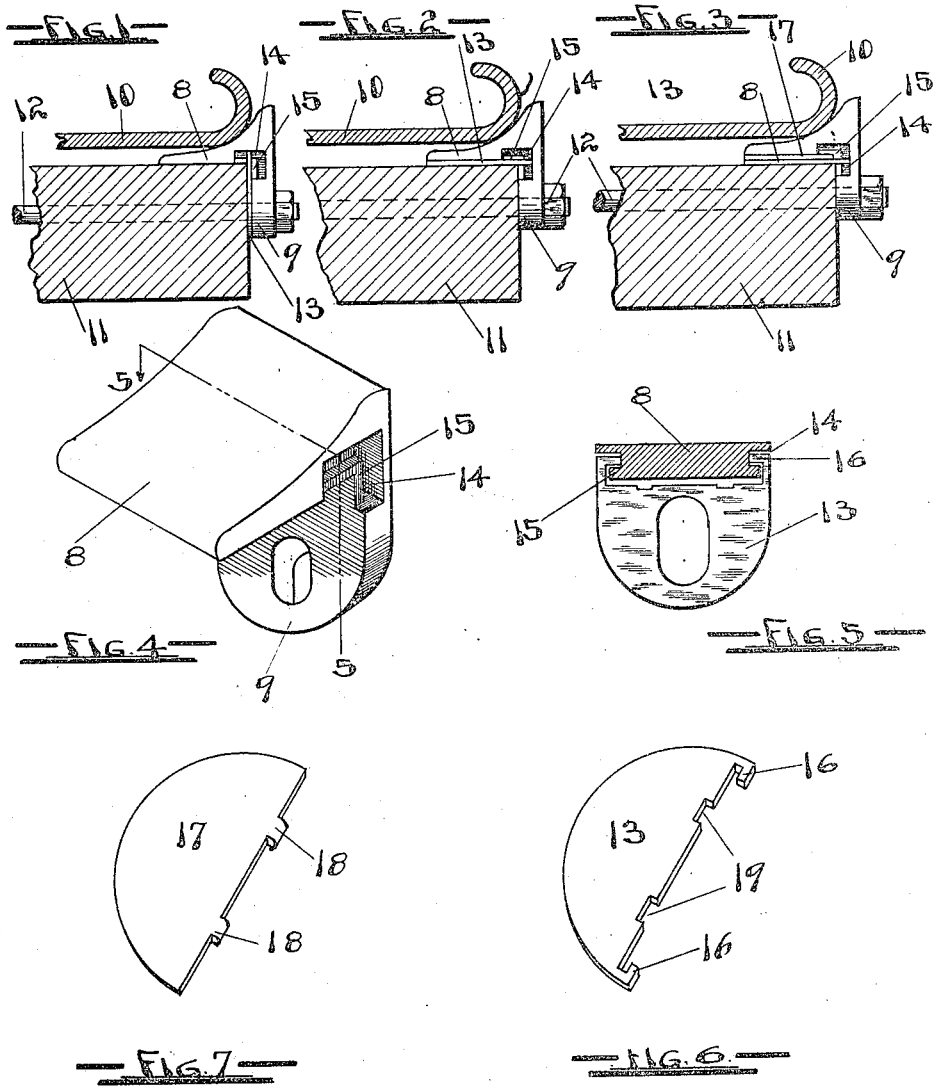

JAMES E. MERWIN, OF PORTLAND, OREGON, ASSIGNOR TO A. E. PERRY, OF PORTLAND, OREGON.

WHEEL-RIM LUG.

1,296,419.  Specification of Letters Patent.  Patented Mar. 4, 1919.

Application filed March 11, 1918. Serial No. 221,845.

*To all whom it may concern:*

Be it known that I, JAMES E. MERWIN, a citizen of the United States, residing at Portland, county of Multnomah, State of Oregon, have invented certain new and useful Improvements in Wheel-Rim Lugs, of which the following is a specification.

My invention relates to wheel rim lugs in general, and particularly to such lugs as are used on automobile wheels to fasten the tire rims upon the fellies.

The object of my invention is to provide in such a lug means to shim it up to take up the wear.

I accomplish this object by means of the construction illustrated in the accompanying drawing which is a part of this application for Letters Patent, like characters of reference indicating like parts throughout the several views, and in which;

Figure 1 is a sectional view of a rim and felly, with my lug in place without shimming.

Fig. 2 is a sectional view of a rim and felly with my lug in place with one shim in use.

Fig. 3 is a sectional view of a rim and felly with my lug in place with two shims in use.

Fig. 4 is a perspective view of my lug.

Fig. 5 is a sectional view of my lug upon line 5—5 of Fig. 4, and showing the shim in place.

Fig. 6 is a perspective view of the shim.

Fig. 7 is a perspective view of a supplemental shim.

In general my invention consists of a lug adapted for insertion between the rim and the felly, and to be secured to the felly, and a shim secured to the lug and adapted to be disposed either between the lug and the side of the felly, or between the lug and the periphery of the felly.

The lug is composed of two parts, a wedge member 8, and an apron 9.

Said wedge and apron are substantially normal one to the other, the wedge being adapted for insertion between the rim 10 and the felly 11, and the apron being adapted to lie against the outside vertical surface of the felly to which it is secured by bolts 12.

A shim 13 is secured to the lug, and adapted to lie either between the apron 9 and the felly 11, as shown in Fig. 1, or between the wedge 8 and the felly 11, as shown in Fig. 2.

In the latter case the wedge 8 has substantially been thickened by the presence of the shim 13 thereby taking up any wear upon either the rim, felly or lug that may have been occasioned by previous use.

To prevent the loss of the shim when not in use as a shim, as shown in Fig. 1, I provide recesses 14 in the edges of the lug at the junction of the wedge 8 and the apron 9, said recesses being right angled in shape, one leg thereof being in the wedge 8 and the other in the apron 9, as shown in Fig. 4.

Upon the inner edges of said recesses I provide a tongue 15, right angled in shape, extending around the inner edge of said recess, and slightly below or removed from the surface of the edge of the lug, as shown in Figs. 4 and 5.

The shim 13 is provided with hooks 16 adapted to embrace said tongue 15 and enter said recess 14, as shown in Figs. 5 and 6.

To assemble the shim and the lug the hooks 16 are slightly bent and sprung into place in their respective recesses 14.

By sliding the hooks 16 in their recesses 14 the shim may be changed from the position shown in Fig. 1 to that shown in Fig. 2 at will.

In case shim 13 should not prove thick enough I provide a supplemental shim 17 which may be placed between shim 13 and rim 10, as shown in Fig. 3.

To secure said supplemental shim in place I provide thereon hooks 18 adapted to engage suitable notches 19 in shim 13, as shown in Figs. 6 and 7.

My invention may be made of any size and constructed of any material deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others skilled in the art may be enabled to construct and to use the same what I claim as new and desire to secure by Letters Patent is;

1. A combined wheel lug and shim, consisting of a lug having a wedge portion and an apron portion, and a shim of thin material pivotally secured to said lug substantially at the juncture of said apron and said wedge portions, and adapted to lie against either said wedge portion or said apron portion.

2. In a wheel lug, a wedge portion; an apron portion integral therewith; there being a recess in each edge of said lug at the junction of said wedge portion and said apron portion; a shim; and hooks upon said shim adapted to enter said recesses and movably secure said shim to said lug.

3. A wheel lug and a shim pivotally secured thereto, said shim being adapted to lie upon the periphery of the wheel felly or against the vertical face of the wheel felly.

4. A wheel lug; a shim pivotally secured thereto; and a supplemental shim adapted to be hooked to said first mentioned shim.

In witness whereof I claim the foregoing as my own I hereunto affix my signature in the presence of two subscribing witnesses at Portland, county of Multnomah, State of Oregon, this 2nd day of March 1918.

JAMES E. MERWIN.

Witnesses:
  LEVI J. ROBINSON,
  C. F. BLAKE.